No. 723,150. PATENTED MAR. 17, 1903.
G. M. FENN.
MACHINE FOR MAKING ARTIFICIAL FUEL BRIQUETS.
APPLICATION FILED NOV. 25, 1902.
NO MODEL. 4 SHEETS—SHEET 1.
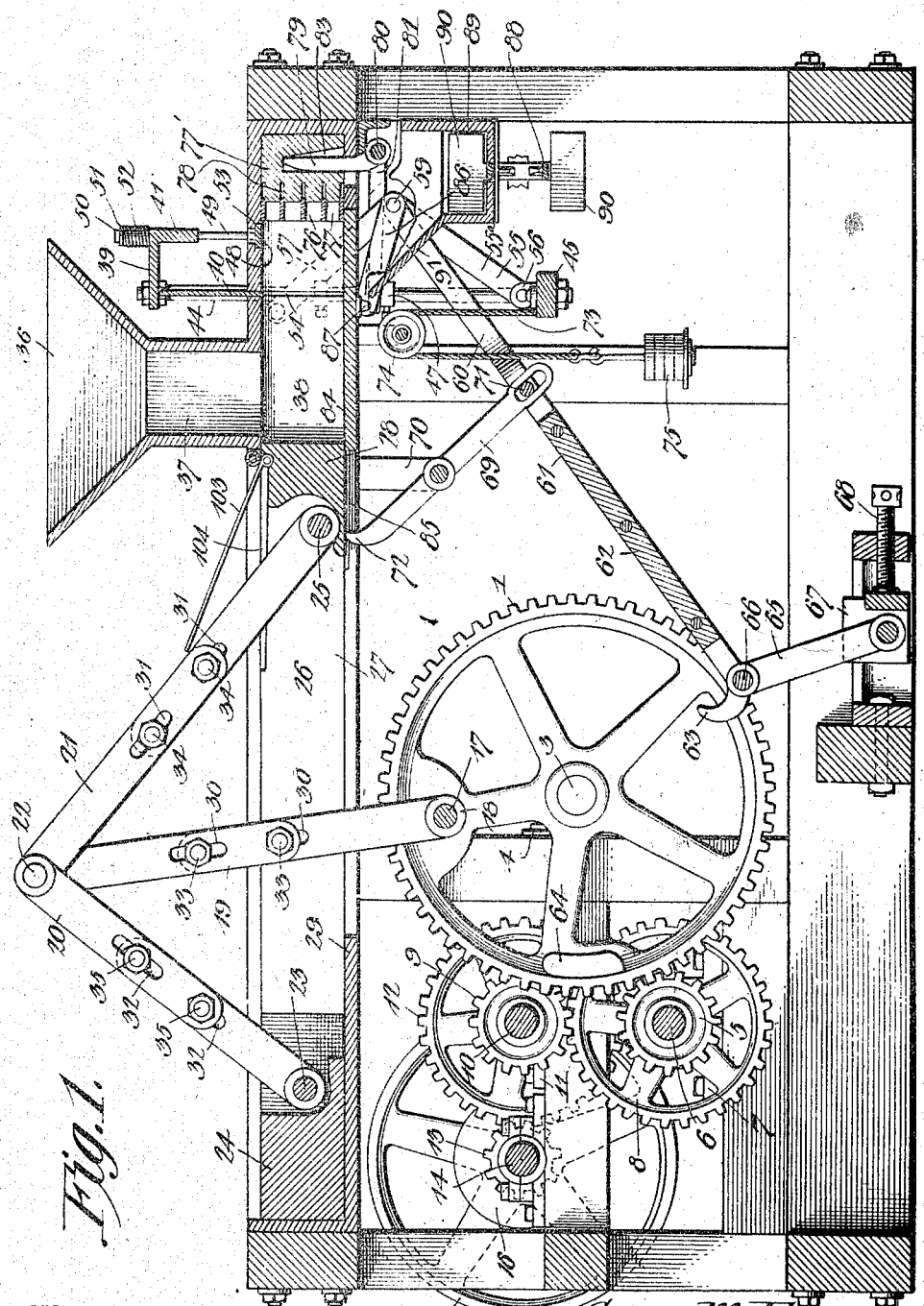

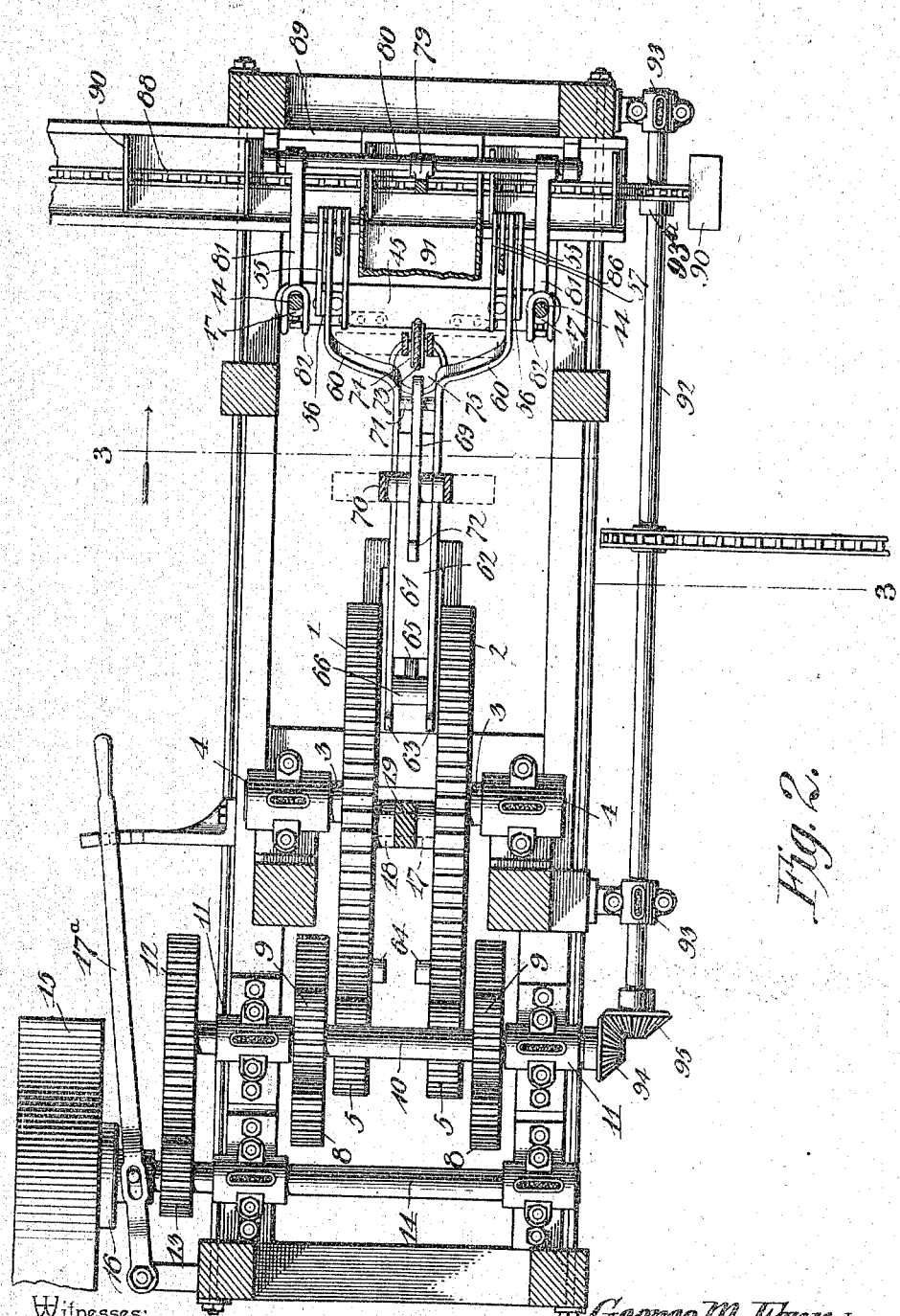

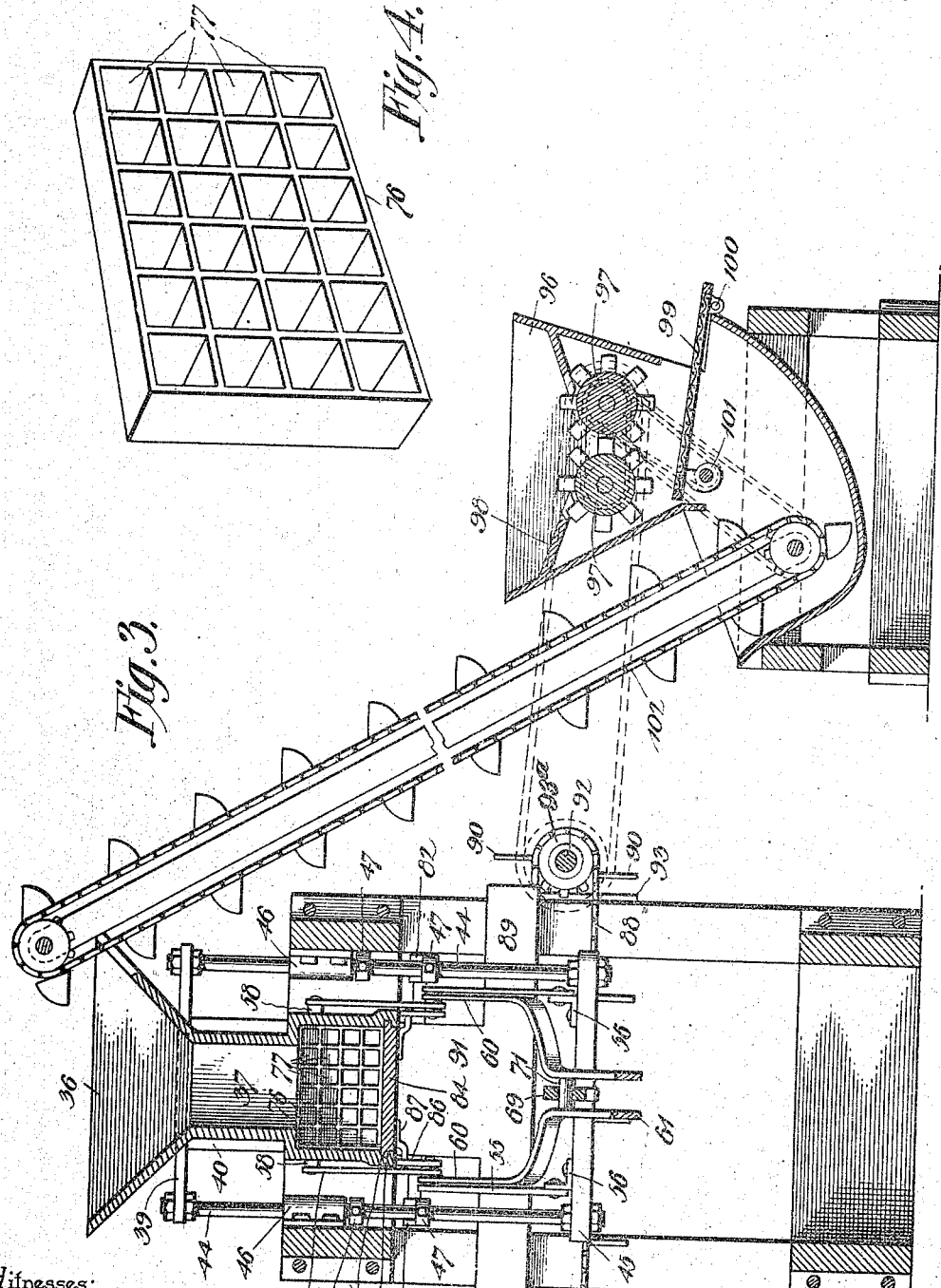

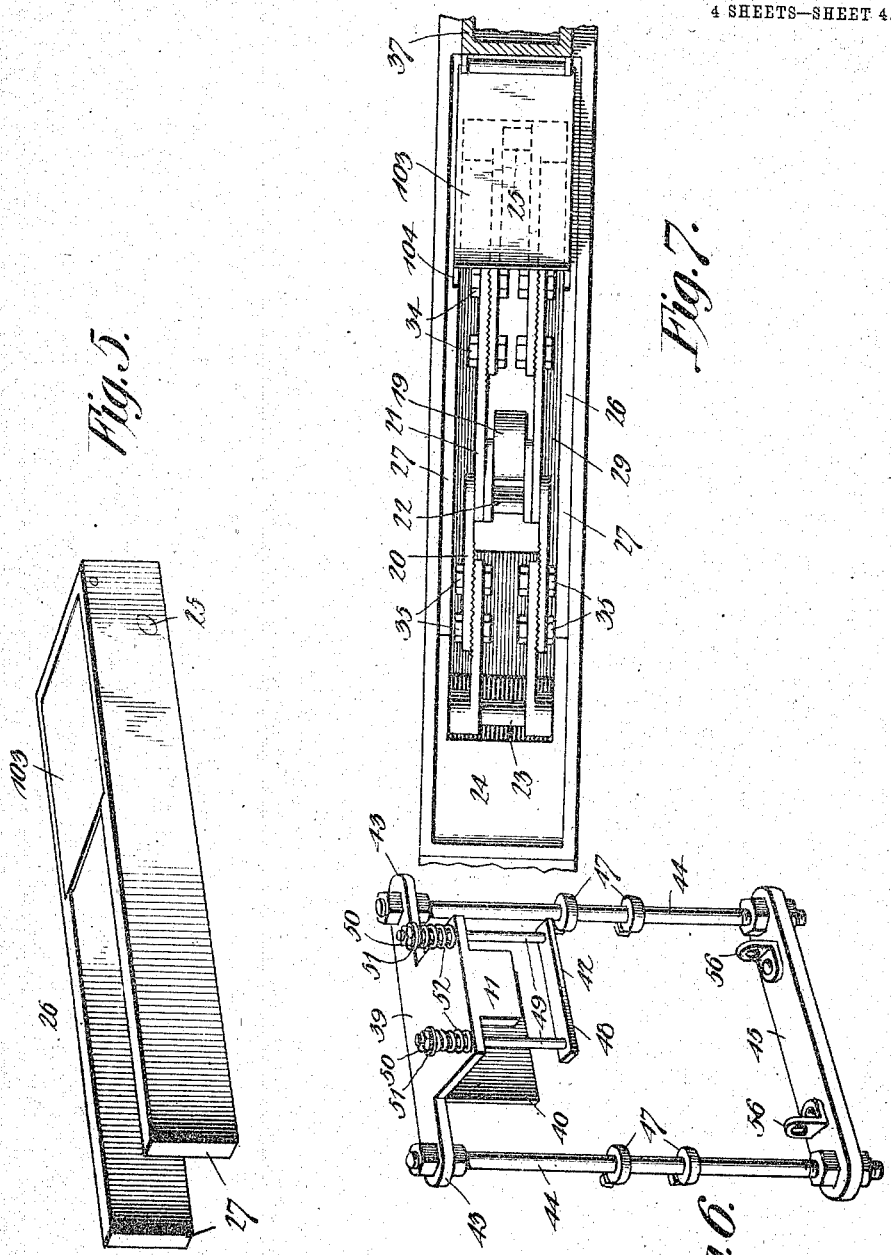

UNITED STATES PATENT OFFICE.

GEORGE MERRIHUE FENN, OF CHARLOTTE, MICHIGAN.

MACHINE FOR MAKING ARTIFICIAL-FUEL BRIQUETS.

SPECIFICATION forming part of Letters Patent No. 723,150, dated March 17, 1903.

Application filed November 25, 1902. Serial No. 132,804. (No model.)

*To all whom it may concern:*

Be it known that I, GEORGE MERRIHUE FENN, a citizen of the United States, residing at Charlotte, in the county of Eaton and State of Michigan, have invented a new and useful Machine for Making Artificial-Fuel Briquets, of which the following is a specification.

This invention relates to machines for making artificial-fuel briquets.

The object of the invention is in a ready, simple, rapid, thoroughly feasible, and practical manner to compress divided combustible material, such as peat, into coherent form and to present it in such shape that in burning it will not disintegrate, but will retain its form and burn from the exterior after the manner of ordinary coal.

With these and other objects in view, as will appear as the nature of the invention is better understood, the same consists, generally stated, in a machine comprising means for molding the material into blocks or briquets of definite shape and size, means for forcing the product from the mold, and means for conveying the product from the machine.

The invention further contemplates means for supplying the material to a feed-chamber, means for forcing the material from the chamber into a mold, means for cutting off the supply of material when the predetermined amount has been fed to the mold, means for forcing the finished product from the mold, means for permitting escape of the product from the feed-chamber, and means for conveying the product from the machine.

The invention contemplates the provision of means for the various adjustment of its parts, thereby to cause the timing thereof to be sequential and exact.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in vertical longitudinal section through a machine characterized by the present invention. Fig. 2 is a view in plan, partly in section, viewed from above. Fig. 3 is a view in transverse section taken on the line 3 3 of Fig. 2 and looking in the direction of the arrow thereon, showing more particularly the mold and feeding mechanism. Fig. 4 is a perspective detail view of the mold. Fig. 5 is a perspective view of the plunger. Fig. 6 is a perspective detail view of the cut-off and the ejecting mechanism. Fig. 7 is a view in plan, showing more particularly the means for preventing the material from escaping into the interior of the machine.

The invention embodies plunger-operating mechanism, feed-cut-off and ejecting mechanism and means for operating the same, a mold-clearing device and means for operating the same, and feed and discharge mechanisms, and in order to facilitate an understanding of the invention the machine will be described under the headings above given, and in the order named, after which a full description of the entire machine will be supplied.

Referring to the drawings, and particularly to Figs. 1 and 2 thereof, 1 and 2 designate two master-wheels supported by suitable shafts 3, journaled in bearings 4, carried by the frame of the machine. These wheels are driven by a train of gearing comprising two pinions 5, meshing with the master-wheels and carried by a shaft 6, mounted in suitable bearings 7 on the frame. Rigidly keyed to said shaft are two gears 8, which mesh with two pinions 9, carried by a shaft 10, mounted in suitable bearings 11 on the frame, the said shaft carrying at one end a gear 12, which meshes with a pinion 13, carried on the drive-shaft 14, upon which is mounted a band-wheel 15, driven by any suitable source of power, (not necessary to be shown,) the shaft 14 being provided with a suitable clutch 16, actuated by a lever 17ᵃ in the usual manner. The master-wheels are connected by a wrist-pin 17, upon which is journaled a sleeve 18, constituting one terminal of a lever 19, the other terminal of which is fitted between links 20 and 21, which, together with the lever 19, constitute a toggle-joint. As shown in Fig. 7, there are two links 20 and 21, each consisting of two members, between which the lever is held by a knuckle-joint 22 in the usual manner. The lower terminals of the links 20 are journaled upon a rod 23, mounted in an abutment 24, secured in the upper portion of the frame of the machine, and the lower terminals of the links 21 are journaled upon a bar 25, carried by a plunger 26, which, as shown in detail in Fig. 5, consists of two spaced members 27 and a head 28, the plunger being mounted for reciprocatory movement upon a plate 29, secured to the top of the frame. In order to regulate the throw of the plunger, and thus increase or diminish its compressive powers, the lever and each of the links is constructed of two members which overlap, the overlapped portions having their opposed faces serrated and provided with longitudinal slots 30, 31, and 32, through which are passed pairs of bolts 33, 34, and 35, as clearly shown in Fig. 1, nuts carried by the bolts serving to clamp the serrated portions firmly together in their adjusted positions.

From the description thus far given it will be seen that as the master-wheels rotate the lever 19 will alternately be lowered and raised, and on the first-named movement the plunger will be projected to effect compressing of the peat or other material and on the other movement will be retracted to permit a fresh charge of the peat to be supplied to the feed-chamber.

The top of the frame is provided with a hopper 36, terminating in a neck 37, which communicates with the feed-chamber 38, and the head of the plunger when at the limit of its return stroke is disposed substantially in alinement with the rear wall of the neck, thus to prevent interference with the material being supplied to the feed-chamber. Working within the feed-chamber is a combined feed-cut-off and ejecting device (shown in detail in Fig. 6) comprising a plate 39, having two depending flanges 40 and 41, the flange 40 constituting a gate or cut-off to prevent loose material from dropping through when the plunger recedes to take a new charge and the flange 41 constituting an actuator for the ejector 42. The plate 39 is provided with lateral extensions 43, to which are securely attached the upper ends of a pair of rods 44, the lower ends of which are rigidly secured to a bar 45. The rods 44 are mounted in boxes 46, Fig. 3, secured to the inner sides of the upper members of the frame, and each carries a pair of adjustable collars 47, the function of which will presently appear. The ejector comprises a plate 48, near the terminals of which are secured two rods 49, which extend through openings in the plate 39 on each side of the flange 41, and each carries at its upper end a nut 50 and a washer 51, and mounted upon the rods between the washers and upper side of the plate are coiled springs 52, the function of which is normally to hold the plate 48 in a recess 53 in the under side of the top of the feed-chamber, as clearly shown in Fig. 1, thus to obviate the presentation of an obstruction that would catch upon the substance being supplied to the mold. The gate 40 works in transversely-alined vertical grooves 54 in the sides of the feed-chamber, and thus positively cuts off any escape of loose material from the machine on the return stroke of the plunger. The mechanism for actuating the gate and the ejector comprises a pair of toggles 55, the lower links 55ª of which are pivoted to ears 56, carried by the bar 45 and the upper links 57 to bosses 58, Fig. 3, on the outer sides of the feed-chamber. Connecting with the knuckle-pin 59 of each pair of toggles is one member 60 of a two-armed lever 61, said members being spaced at the proper distance apart by a spacing-block 62. (Clearly shown in Fig. 2.) The lower end of each member of the lever is formed into an upward-curved toe 63 to be engaged by lugs 64, carried by the inner faces of the master-wheels near their peripheries. The lever is supported at its lower end for rocking movement by a link 65, having a fulcrum-pin 66, connecting the lower terminals of said lever, the lower end of the link being fulcrumed upon an adjustable block 67, as clearly shown in Fig. 1, the block being reciprocated through the medium of a screw 68 and operating to raise or lower the toes to effect their proper adjustment with relation to the lugs 64. It will be seen that as the master-wheels revolve the lugs 64 will engage with the toes 63, and thus straighten the toggles connecting with the feed-cut-off and ejecting mechanisms, causing the bar 45 to be depressed and forcing the gate down into the grooves of the feed-box, thus to prevent escape of loose material when the plunger recedes. On initial downward movement of the plate 39 the plate 48 will be held in the recess 53 in the feed-chamber by the springs 52; but by the time the springs have ceased to exert upward pressure the flange 41 engages with the plate 48 and forces it downward, thus to free the briquets from the mold should they be caught or stick therein. To break the joints of the toggles 55, a trip device is provided in conjunction with counterweights. The trip device comprises a lever 69, fulcrumed intermediate of its ends upon a hanger 70, secured to the under side of the top of the frame. The lower end of this lever is slotted to receive a pin 71, passing through the members of the lever 61, as shown clearly in Fig. 2, and the upper end of the lever is provided with a curved toe 72, located in the path of movement of the plunger-head. As will presently appear, when the plunger recedes to permit a fresh charge of material to the feed-chamber its rear end contacts with the toe 72 and rocks the lever 69, whereupon the lever 61 will be moved rearward, breaking the joints of the said toggles 55. The mechanism for causing the feed, the cut-off, and the ejecting mechanisms to resume their normal positions, or that shown in Fig. 1, comprises a chain or cord 73, one end of which is connected with the bar 45, the intermediate portion being passed over a sheave 74, supported on the under side of the top of the machine, the free end of the flexible connection carrying counterweights 75, of which there may be any desired number. It will be seen that when the joints of the toggles 55 are broken the counterweights will instantly exert an upward pull upon the bar 45, causing it to lift and bring the feed-cut-off and ejecting mechanisms back to their normal position.

The mold 76 may be provided with any desired number of pockets 77 to form the briquets, and is rigidly secured within the rear portion of the feed-chamber. Back of the mold is the clearing device therefor, consisting of a head 77', having recesses 78 to receive the walls of the mold-partitions. This head is reciprocated through a rock-lever 79, fulcrumed on a bar 80 on the under side of the feed-chamber, said bar having rigidly secured to it a pair of arms 81, the outer end of each of which is provided with a yoke 82 to straddle the rods 44 between the collars 47, as clearly shown in Figs. 2 and 3. The rock-lever is disposed within a recess 83 in the head and has, by preference, its forward face rounded to present a cam-surface. Under the arrangement shown it will be seen that as the feed-cut-off and ejecting mechanisms are depressed the upper pair of collars will engage with the yokes of the arms 81 and will depress them, thereby throwing the rock-lever forward and moving the head into the mold. The collars are to be spaced such a distance apart that the rock-lever will have actuated the head to force the molded briquets from the mold before the ejector begins to operate, and this timing of the parts can be determined by means of the said collars and also of the adjusting-block 67. The under side of the feed-chamber is closed by a slide 84, the sides of which are provided with guides 84ᵃ to work in recesses 85 in the inner opposed faces of the side walls of the feed-chamber, as shown in Fig. 3. The slide is actuated to release the finished briquets through the medium of links 86, one terminal of each of which is fulcrumed on brackets 87 on the under side of the slide and the opposite terminals to the knuckle-pin 59 of the feed-cut-off-actuating toggles. It will be seen that as the members of the said toggles are straightened through the medium of the lever 61 the links 86 will be projected forwardly, thereby moving the slide 84 to permit escape of the finished briquets.

It is to be understood that all of the parts so far described are to be timed in such manner that their action will be sequential.

The means for removing the finished briquets from the machine comprises a sprocket-chain 88, constituting a belt which is disposed in a trough 89 beneath the feed-chamber, the belt having vertical blades 90 secured to it by which to convey the material along to the place of discharge. The trough has an inclined lateral projection 91, as shown in Fig. 1, which will operate to guide the finished product onto the conveyer-belt. This belt is disposed at right angles to the machine and is driven by a shaft 92, supported in suitable bearings 93 on the side of the supporting-frame, said shaft carrying at one end a sprocket-wheel 93ᵃ, which meshes with a sprocket-chain 88. The shaft 92 is driven from the shaft 10 through the medium of bevel gears 94 and 95, as clearly shown in Fig. 2.

In order to place the peat or other material in best condition for compression, it is necessary that it should be in a finely-divided state, and to accomplish this a crushing or pulverizing mill is employed in connection with the machine, as shown in Fig. 3. This mill comprises a hopper 96, into which the material is fed and in which is disposed two crushing-cylinders 97 of any preferred construction. Above the crushing-cylinders and projecting from opposite sides of the hopper are deflecting-plates 98, which operate to direct the material onto the cylinders. Beneath the cylinders and in the throat of the hopper is a screen 99, pivoted to the throat of the hopper at 100, the said screen having a vertical vibratory motion imparted to it through a cam 101. Dipping into the throat of the hopper is an endless bucket conveyer 102, which is arranged on an incline and discharges immediately over the hopper 96. The object of the screen is to shed the material of any stones or large lumps which have escaped the action of the crushing-cylinders, the vibratory motion of the screen operating to feed only finely-divided material into the throat of the chute, whence it is elevated and discharged into the hopper of the machine in a manner well understood.

In order to prevent escape of the material between the members of the plunger-head-actuating toggles when the plunger is within the feed-chamber, a plate 103 is provided which is hinged to the upper forward portion of the plunger-head and rests upon the toggle members 21, the sides of the plunger being provided with recesses 104, in which the plate will rest when the head is in the chamber, thus to prevent any interference with the walls of the neck of the feed-hopper. As will be readily understood by reference to Fig. 1, this plate or shield will rise and fall as the plunger is reciprocated, so as not to present any obstruction to the proper operation of the machine.

All of the operations of the machine are rapid and certain and the output is of uniform character, is dense, and while burning readily does not disintegrate, but burns exteriorly in the same manner as ordinary coal.

Having thus described the invention, what I claim is—

1. A machine of the character specified, comprising a feed-chamber, means for forcing the material from the chamber, a mold to receive the material, means operable during the return stroke of the forcing means for cutting off the supply of material from the chamber, and means for forcing the finished product from the mold.

2. A machine of the character specified, comprising a feed-chamber, a mold, means for forcing material from the chamber into the mold, means operable during the return movement of the forcing means for cutting off the supply of material from the chamber, means for forcing the finished product from the mold, and means for discharging the product from the feed-chamber.

3. A machine of the character specified, comprising a feed-chamber, a mold, means for forcing material from the chamber into the mold, means operable during the return movement of the forcing means for cutting off the supply of material from the chamber, means for forcing the finished product from the mold, means for permitting escape of the product from the feed-chamber, and means for conveying the product from the machine.

4. A machine of the character specified, comprising a feed-chamber, means for supplying material to said chamber, a plunger, a stationary mold, means for actuating the plunger to force the material into the mold, means independent of the plunger for forcing the product from the mold, and means for permitting the escape of the product from the feed-chamber.

5. A machine of the character specified, comprising a feed-chamber, a mold disposed near one end thereof, a plunger for forcing the material into the mold, a cut-off operable during the return movement of the plunger for controlling the supply of material to the mold, means for forcing the finished product from the mold, an ejector actuated by the cut-off to discharge the product from the chamber, and a slide constituting the bottom of the chamber and movable to permit the escape of the product from said chamber.

6. An apparatus of the character specified, comprising a plunger, a toggle for actuating the same, master-wheels for actuating the toggle, a mold, a head coacting with the mold to discharge the finished product, a cut-off and an ejector, a toggle operating in connection with the cut-off, a lever connecting with the latter toggle and having its lower end fulcrumed in the path of movement of the master-wheels, means carried by the master-wheels to rock the lever and thus to depress the cut-off and ejector, a rock-lever connected with the mold-clearing head and actuated by the movement of the cut-off, and means actuated by the plunger to break the joint of the cut-off toggle to permit the parts to resume their normal position.

7. In a machine of the character specified, the combination with a feed-chamber and a mold, of a cut-off and an ejector, a toggle connected with the cut-off, means for operating the toggle to cause the cut-off to perform its function, and means for breaking the joints of the toggle and causing the automatic return of the cut-off and ejector to their normal positions.

8. In a machine of the character specified, the combination with a feed-chamber and a plunger, of a mold, means for forcing the finished product therefrom, a cut-off and an ejector, a toggle for actuating the cut-off and the ejector, means for actuating the toggle on the forward movement of the plunger, and means actuated by the plunger on its rearward movement to break the joints of the toggle.

9. In a machine of the character specified, the combination with a mold and a plunger, of a master-wheel, a toggle having one of its members operatively connected therewith, the members of the toggle being adjustable to vary the throw of the plunger, a cut-off and an ejector, a toggle for actuating these parts, a lever connected at one end with the last-named toggle, an adjustable rocking bearing for the lower end of the lever, and means carried by the master-wheel to actuate said lever to cause operation of the cut-off and ejector.

10. In a machine of the character specified, the combination with a feed-chamber and a plunger working therein, of a cut-off and ejector, a frame with which said parts are connected, a toggle operatively connected with the frame, a lever connected with the toggle and having its lower end provided with a toe, an adjustable rocking bearing supporting the lower end of the lever, and a master-wheel for actuating the plunger, said wheel being provided with means for engaging the toe, thus to actuate the toggle.

11. In a machine of the character specified, the combination with a feed-chamber, of a vertically-movable frame, a spring-retracted ejector carried thereby, adjustable collars carried by the frame, a toggle for operating the frame, a mold-clearing head mounted in the chamber, and a rock-shaft having one member engaging the head and the other member disposed between the said collars.

12. In a machine of the character specified, the combination with a feed-chamber, of a plunger, and means for actuating the same, of a pivoted shield carried by the plunger and operating to prevent escape of material past the plunger when the same enters the feed-chamber.

13. In a machine of the character specified, the combination with a feed-chamber, of a plunger working therein, a toggle for actuating the plunger, and a shield pivotally connected with the plunger and adapted to bear upon one of the members of the toggle as the plunger is reciprocated thus to prevent escape of material as the plunger enters and leaves the feed-chamber.

In testimony that I claim the foregoing as my own I have hereto affixed my signature in the presence of two witnesses.

GEORGE MERRIHUE FENN.

Witnesses:
C. W. MORRELL,
C. D. YOUNGS.